(12) United States Patent
Kira et al.

(10) Patent No.: US 12,416,994 B2
(45) Date of Patent: Sep. 16, 2025

(54) TOUCH PANEL BUILT-IN DISPLAY DEVICE, AND METHOD FOR CONTROLLING TOUCH PANEL BUILT-IN DISPLAY DEVICE

(71) Applicant: Sharp Display Technology Corporation, Mie (JP)

(72) Inventors: Takatoshi Kira, Kameyama (JP); Masayuki Hata, Kameyama (JP)

(73) Assignee: SHARP DISPLAY TECHNOLOGY CORPORATION, Kameyama (JP)

( * ) Notice: Subject to any disclaimer, the term of this patent is extended or adjusted under 35 U.S.C. 154(b) by 0 days.

(21) Appl. No.: 18/612,162

(22) Filed: Mar. 21, 2024

(65) Prior Publication Data

US 2024/0353952 A1 Oct. 24, 2024

(30) Foreign Application Priority Data

Apr. 21, 2023 (JP) .................................. 2023-070049

(51) Int. Cl.
*G06F 3/045* (2006.01)
*G06F 3/041* (2006.01)

(52) U.S. Cl.
CPC .......... *G06F 3/04166* (2019.05); *G06F 3/045* (2013.01)

(58) Field of Classification Search
CPC .............................. G06F 3/04166; G06F 3/045
See application file for complete search history.

(56) References Cited

U.S. PATENT DOCUMENTS

| 5,648,642 A * | 7/1997 | Miller ................. G06F 3/04166 341/33 |
| 8,243,046 B2 | 8/2012 | Lee et al. |
| 2008/0099253 A1 | 5/2008 | Ishikura et al. |
| 2008/0173867 A1* | 7/2008 | Ichikawa ........... H10D 30/6713 257/E29.1 |
| 2009/0115742 A1 | 5/2009 | Mamba et al. |
| 2016/0004368 A1* | 1/2016 | Kurasawa ........... G06F 3/04166 345/174 |
| 2016/0004372 A1* | 1/2016 | Nakajima ............. G06F 3/0446 345/174 |
| 2020/0333899 A1* | 10/2020 | Kurasawa ............. G02F 1/1676 |

FOREIGN PATENT DOCUMENTS

| CA | 2806719 C | * 11/2015 | ........... G06F 3/0414 |
| CN | 105278785 B | * 11/2018 | ............. G06F 3/012 |
| CN | 116547882 A | * 8/2023 | ........... G01R 31/389 |

(Continued)

*Primary Examiner* — Ricardo Osorio
(74) *Attorney, Agent, or Firm* — Keating & Bennett, LLP (57) ABSTRACT

A touch panel built-in display device comprises a touch coordinate detection circuit. The touch coordinate detection circuit, as to each detection electrode pair, determines presence or absence of a touch by a pointer at a coordinate in a second direction where the detection electrode pair is positioned, based on a total value or a difference value of a detection values of the detection electrode pair, and when determining that a touch is present, calculates a coordinate in the first direction of the touch by the pointer, based on a ratio of a detection value of a first detection electrode of the detection electrode pair at which a touch is determined to be present with respect to the total value of the detection electrode pair.

4 Claims, 10 Drawing Sheets

(56) References Cited

FOREIGN PATENT DOCUMENTS

| | | | |
|---|---|---|---|
| EP | 2960759 B1 * | 2/2020 | ............ G06F 3/041 |
| JP | 2007249260 A * | 9/2007 | |
| JP | 2008-026927 A | 2/2008 | |
| JP | 2009-116423 A | 5/2009 | |
| JP | 2010066856 A * | 3/2010 | |
| JP | 2010-113502 A | 5/2010 | |
| JP | 5454314 B2 | 3/2014 | |
| JP | 6534429 B2 | 6/2019 | |
| KR | 20090056883 A * | 6/2009 | |
| KR | 100921814 B1 * | 10/2009 | |
| WO | WO-2019043446 A1 * | 3/2019 | .......... G05D 1/0287 |

* cited by examiner

TOUCH PANEL BUILT-IN DISPLAY DEVICE, AND METHOD FOR CONTROLLING TOUCH PANEL BUILT-IN DISPLAY DEVICE

BACKGROUND

1. Field

The present disclosure relates to a touch panel built-in display device, and a method for controlling a touch panel built-in display device.

2. Description of the Related Art

JP-A-2010-113502 discloses a touch panel that includes microcapsules in which charged particles and a liquid dispersion medium are encapsulated. This touch panel includes a transparent electrode formed on a touch panel substrate, a back electrode, and a microcapsule electrophoretic display section arranged between the transparent electrode and the back electrode. The transparent electrode is connected with a voltage generation section that generates a position detection voltage and a common voltage, and a position detection section that detects a contact position based on a change in the capacitance of the transparent electrode. In the touch panel, for detecting a touch, the position detection voltage is applied to the transparent electrode, and for rewriting the display of the display section, the common voltage is applied to the transparent electrode. When a touch pen comes into contact with the touch panel substrate while the position detection voltage from the voltage generation section is applied to the transparent electrode, the capacitances at the four corners of the transparent electrode change. Based on this change in capacitance, the position detection section detects the contact position of the touch pen, and sends a predetermined signal as a detection result to a control section.

The touch panel equipped with an electrophoretic display section described in JP-A-2010-113502 is capable of detecting a single contact position of the touch pen (pointer) based on the capacitances at the four corners of the transparent electrode. However, it cannot detect multiple contact positions (touch coordinates) by a pointer(s).

It is an object of the present disclosure to provide a touch panel built-in display device that includes an electrophoretic display section capable of detecting a plurality of touch coordinates, and a method for controlling a touch panel built-in display device.

SUMMARY

To achieve the above-described object, a touch panel built-in display device according to a first embodiment of the present disclosure includes: a plurality of pixel electrodes; a counter electrode arranged to face the plurality of pixel electrodes; an electrophoretic display section that includes charged particles arranged between the plurality of pixel electrodes and the counter electrode; a plurality of detection electrode pairs, each pair including a first detection electrode connected to the counter electrode in an edge part thereof on a first direction side, and a second detection electrode connected to the counter electrode in an edge part thereof on an opposite direction side with respect to the first direction side, the plurality of detection electrode pairs being arrayed in a second direction that crosses the first direction in plan view; and a touch coordinate detection circuit that detects a coordinate in the first direction and a coordinate in the second direction of a touch by a pointer, wherein the touch coordinate detection circuit supplies a voltage to the plurality of detection electrode pairs, acquires a detection value that is a value of current flowing through each of the detection electrodes of the plurality of detection electrode pairs, or a value of potential of the detection electrode, as to each detection electrode pair, determines presence or absence of a touch by a pointer at the coordinate in the second direction where the detection electrode pair is positioned, based on a total value or a difference value of the detection values of the detection electrode pair, and when determining that a touch is present, calculates the coordinate in the first direction of the touch by the pointer, based on a ratio of the detection value of the first detection electrode of the detection electrode pair at which a touch is determined to be present with respect to the total value of the detection electrode pair.

A method for controlling a touch panel built-in display device according to a second embodiment is a method for controlling a touch panel built-in display device that includes: a plurality of pixel electrodes; a counter electrode arranged to face the plurality of pixel electrodes; an electrophoretic display section that includes charged particles arranged between the plurality of pixel electrodes and the counter electrode; a plurality of detection electrode pairs, each pair being composed of a first detection electrode connected to the counter electrode in an edge part thereof on a first direction side, and a second detection electrode connected to the counter electrode in an edge part thereof on an opposite direction side with respect to the first direction side, the detection electrode pairs being arrayed in a second direction that crosses the first direction in plan view, the method including the steps of: supplying a voltage to the plurality of detection electrode pairs; acquiring a detection value that is a value of current flowing through each of the detection electrodes of the plurality of detection electrode pairs, or a value of potential of the detection electrode; as to each detection electrode pair, determining presence or absence of a touch by a pointer at the coordinate in the second direction where the detection electrode pair is positioned, based on a total value or a difference value of the detection values of the detection electrode pair; and when determining that a touch is present, calculating the coordinate in the first direction of the touch by the pointer, based on a ratio of the detection value of the first detection electrode of the detection electrode pair at which a touch is determined to be present with respect to the total value of the detection electrode pair.

DESCRIPTION OF THE EMBODIMENTS

One embodiment of the present disclosure is described below in detail, with reference to the drawings. Identical or equivalent parts in the drawings are denoted by the same reference numerals, and the descriptions of the same are not repeated. To make the description easy to understand, in the drawings referred to hereinafter, the configurations are simply illustrated or schematically illustrated, or the illustration of part of constituent members is omitted. Further, dimension ratios of constituent members illustrated in the drawings do not necessarily indicate actual dimension ratios.
[Overall Configuration of Touch Panel Built-In Display Device]

Figure 1:
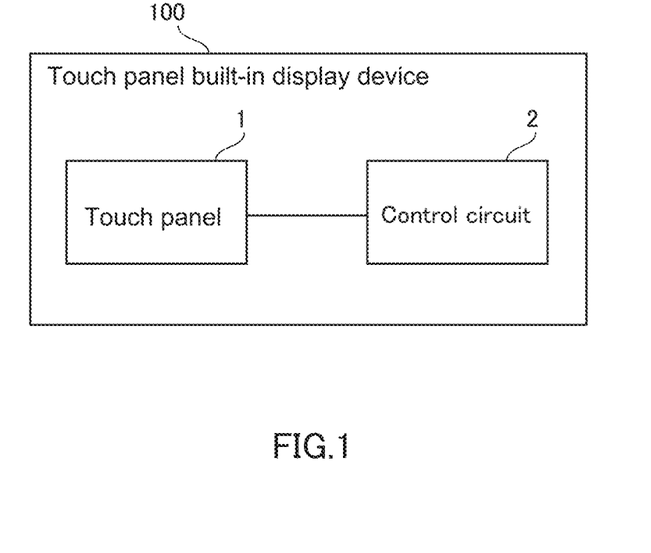
FIG. 1 is a block diagram illustrating a configuration of a touch panel built-in display device 100 according to one embodiment.
Figure 2:
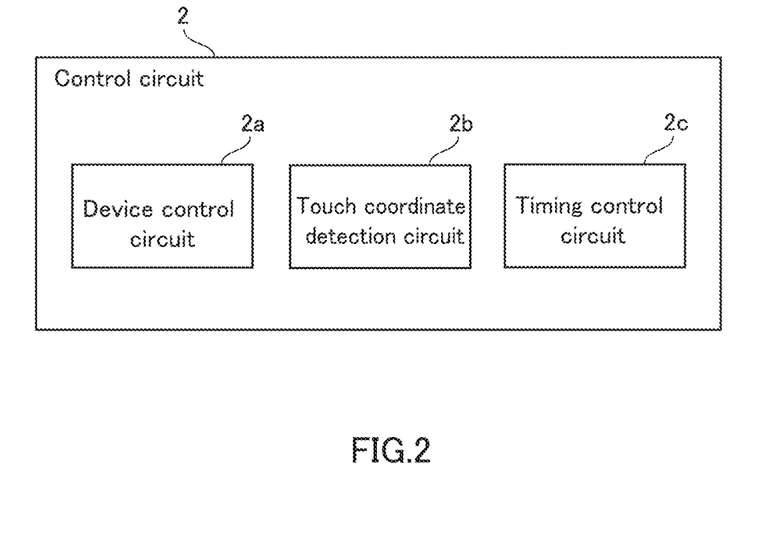
FIG. 2 is a block diagram illustrating a configuration of a control circuit 2.
Figure 3:
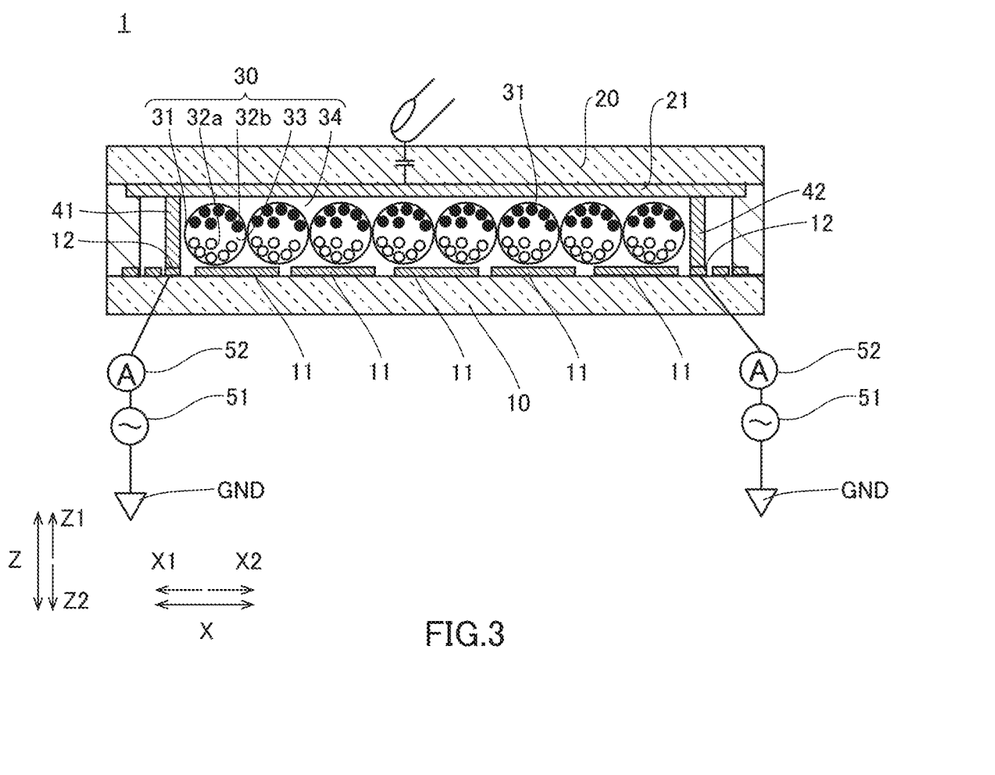
FIG. 3 is a cross-sectional view illustrating a configuration of a touch panel 1 of the touch panel built-in display device 100.

A configuration of a touch panel built-in display device 100 according to the present embodiment (hereinafter referred to as "display device 100") is described. FIG. 1 is a block diagram illustrating a configuration of the display device 100 according to the present embodiment. FIG. 2 is a block diagram illustrating a configuration of the control circuit 2. FIG. 3 is a cross-sectional view illustrating a configuration of a touch panel 1 of the display device 100.

As illustrated in FIG. 1, the display device 100 includes the touch panel 1 and the control circuit 2. In the present embodiment, the display device 100 is configured as an electronic paper, an electrophoretic display, and a non-emissive display. The touch panel 1 displays images or videos based on control signals from the control circuit 2. Furthermore, in the present embodiment, the touch panel 1 detects multiple touched positions (touch coordinates) touched by a pointer(s). The control circuit 2 outputs a control signal to the touch panel 1 and controls the operation of the touch panel 1.

As illustrated in FIG. 2, the control circuit 2 includes a device control circuit 2a, a touch coordinate detection circuit 2b, and a timing control circuit 2c. Each of the device control circuit 2a, the touch coordinate detection circuit 2b, and the timing control circuit 2c is formed as, for example, a System-On-Glass (SOG) formed on a pixel substrate 10 (see FIG. 3). The device control circuit 2a performs a controlling operation of rewriting an image displayed on the touch panel 1. The touch coordinate detection circuit 2b outputs a voltage to the touch panel 1, acquires detection values from the touch panel 1, and detects a touch(es) (contact(s)) on the touch panel 1 by a pointer(s) (finger(s) or pen(s)) based on the detection value. The touch coordinate detection circuit 2b transmits a touch detection result (report) to the control circuit 2. The device control circuit 2a obtains a report of touch coordinates of the position(s) touched by the pointer(s), from the touch coordinate detection circuit 2b, and controls the display device 100 according to the report. The timing control circuit 2c switches between a state in which the touch panel 1 (counter electrode 21) and the device control circuit 2a are connected and a state in which the touch panel 1 (counter electrode 21) and the touch coordinate detection circuit 2b are connected.

As illustrated in FIG. 3, the touch panel 1 includes a pixel substrate 10, a counter substrate 20, an electrophoretic display section 30, detection electrodes 41, and detection electrodes 42. The pixel substrate 10 and the counter substrate 20 are flexible substrates. In addition, the pixel substrate 10 is a transparent substrate that transmits visible light. The pixel substrate 10 and the counter substrate 20 are, for example, resin film substrates of polyethylene terephthalate (PET). A plurality of pixel electrodes 11 and a plurality of lines 12 are arranged on the pixel substrate 10. The pixel electrodes 11 are made of a metal or a conductor such as indium tin oxide (ITO). The pixel electrodes 11 are arranged in matrix in plan view. Further, the lines 12 are formed of a metal (copper, gold, silver, etc.) on a surface of the pixel substrate 10, for example.

The counter substrate 20 is arranged to face the pixel substrate 10 in a normal direction with respect to the pixel electrode 10 (in Z1 direction in FIG. 2). A counter electrode 21 is arranged on the counter substrate 20. The counter electrode 21 is arranged to face the pixel electrodes 11. That is, the counter electrode 21 is one common electrode provided in common to the pixel electrodes 11. The counter electrode 21 is a transparent electrode that transmits visible light. As the counter electrode 21, for example, indium tin oxide (ITO) can be used. The counter electrode 21 is connected to the lines 12 via the detection electrodes 41 or the detection electrodes 42.

The electrophoretic display section 30 is arranged between the pixel substrate 10 and the counter substrate 20. The electrophoretic display section 30 includes a plurality of microcapsules 31, a plurality of charged particles 32a and 32b, a dispersion medium 33, and an insulating layer 34. The microcapsules 31 are arranged within the insulating layer 34. The charged particles 32a and 32b and the dispersion medium 33 are enclosed within the microcapsules 31. The charged particles 32a and 32b include white charged particles 32a and black charged particles 32b. For example, the white charged particles 32a are positively charged, and the black charged particles 32a are negatively charged. The dispersion medium 33 is liquid with insulating properties such as, for example, an organic solvent. The insulating layer 34 fills a space between the pixel substrate 10 and the counter substrate 20. The insulating layer 34 is, for example, a layer made of a polymeric resin material.

Then, by applying a predetermined voltage across the pixel electrodes 11 and the counter electrode 21, when the pixel electrodes 11 become positive electrodes and the counter electrode 21 becomes a negative electrode, the black charged particles 32b are attracted to the pixel electrodes 11, and the white charged particles 32a are attracted to the counter electrode 21. In this case, white color is displayed by the touch panel 1 to the user observing from the counter substrate 20 side. Furthermore, as illustrated in FIG. 3, when the pixel electrodes 11 become negative electrodes and the counter electrode 21 becomes a positive electrode, the black charged particles 32b are attracted to the counter electrode 21, and the white charged particles 32a are attracted to the pixel electrode 11. In this case, black color is displayed by the touch panel 1 to the user observing from the counter substrate 20 side.

The detection electrodes 41 and the detection electrodes 42 are, for example, common transfer electrodes arranged between the pixel substrate 10 and the counter substrate 20. The detection electrodes 41 and the detection electrodes 42 include conductive particles arranged within a resin material, and thereby have conductivity. With this configuration, the detection electrodes 41 and the detection electrodes 42 electrically connect the counter electrode 21 and the lines 12.

Figure 4:
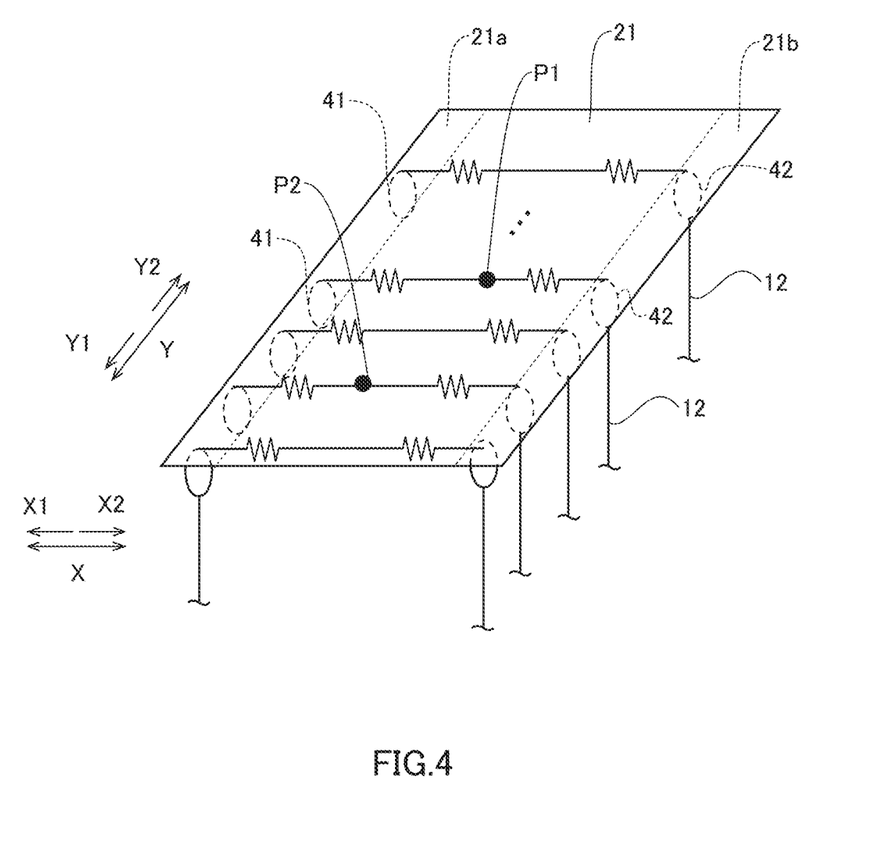
FIG. 4 is a perspective view schematically illustrating a configuration of the touch panel 1.

FIG. 4 is a perspective view schematically illustrating a configuration of the touch panel 1. Here, the X axis is an axis on a plane of the touch panel 1. The Y axis is an axis on the plane of the touch panel 1, and is perpendicular to the X axis. An X1 direction is one direction parallel to the X axis, and an X2 direction is a direction opposite to the X1 direction. A Y1 direction is one direction parallel to the Y axis, and a Y2 direction is a direction opposite to the Y1 direction. As illustrated in FIG. 4, the detection electrodes 41 are connected to the counter electrode 21 in an edge part 21a thereof on the X1 direction side. The "edge part" means not only an end portion of the electrode, but also an area within a predetermined range from the end portion. The area within the predetermined range is, for example, an area of the counter electrode 21 that is outside the electrophoretic display section 30 in plan view.

The detection electrodes 41 are arranged at intervals in a direction parallel to the Y axis. For example, the detection electrodes 41 are arranged at equal intervals in the Y1 direction. Further, the detection electrodes 42 are connected to the counter electrode 21 in an edge part 21b thereof on the X2 direction side. The detection electrodes 42 are arranged at intervals in the Y1 direction. For example, the detection electrodes 42 are arranged at equal intervals in the Y1 direction. The number of the detection electrodes 41 is the same as the number of the detection electrodes 42. Regarding resistances illustrated in FIG. 4, they are schematic illustrations of internal resistances in the counter electrode 21, and do not indicate that resistors are arranged on the counter electrode 21.

Figure 5:
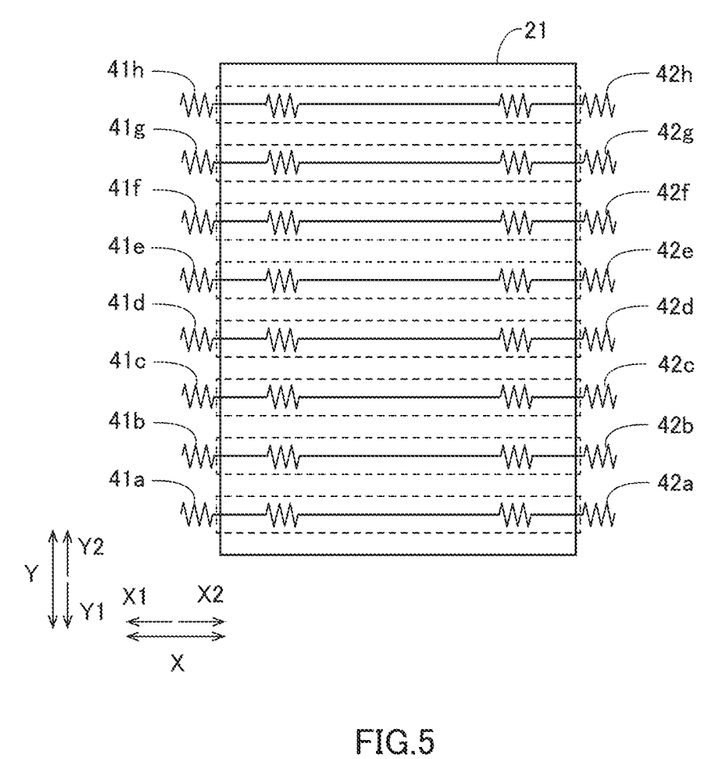
FIG. 5 is a diagram for explaining connection relationship between a counter electrode 21 and detection electrodes 41 and 42.

FIG. 5 is a diagram for explaining connection relationship between the counter electrode 21 and the detection electrodes 41 and 42. As illustrated in FIG. 5, to distinguish the detection electrodes 41 from one another, the detection electrodes 41 are referred to as detection electrodes 41a to 41h in the order directed in the Y2 direction. Further, to distinguish the detection electrodes 42 from one another, the detection electrodes 42 are referred to as detection electrodes 42a to 42h in the order directed in the Y2 direction. Here, the detection electrode 41a has the same coordinate in the direction parallel to the Y axis (referred to as the "Y coordinate") as that of the detection electrode 42a. The detection electrodes 41b to 41h have the same Y coordinates as those of the detection electrodes 42b to 42h, respectively. Here, two detection electrodes having the same Y coordinate (for example, the detection electrode 41a and the detection electrode 42a) are referred to as a "detection electrode pair." The detection electrodes 41b to 41h form detection electrode pairs with the detection electrodes 42b to 42h, respectively.

Figure 6:
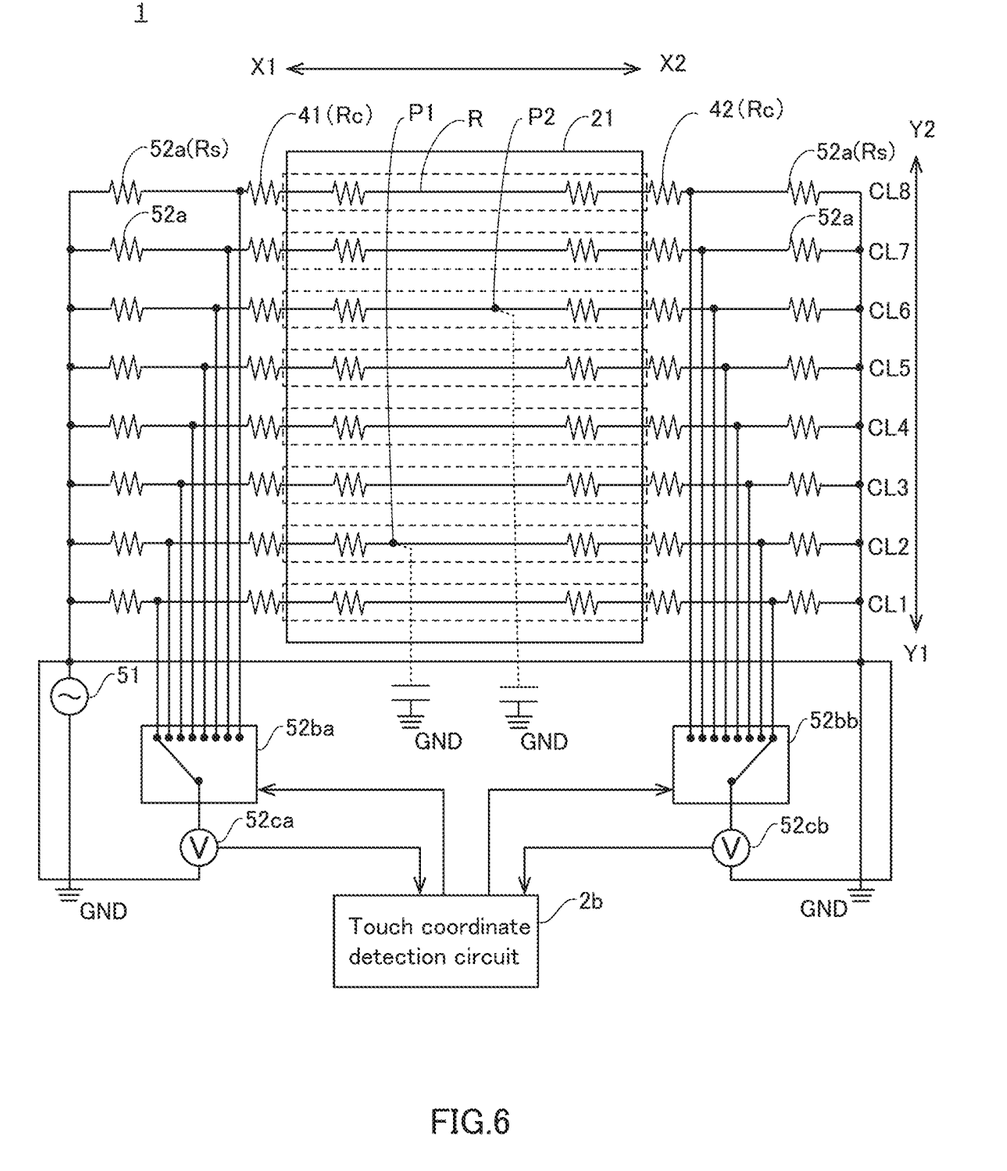
FIG. 6 is a diagram for explaining connection relationship between the counter electrode 21 and a touch coordinate detection circuit 2*b*.

FIG. 6 is a diagram for explaining connection relationship between the counter electrode 21 and the touch coordinate detection circuit 2b. As illustrated in FIG. 6, a resistance value of the counter electrode 21 between the detection electrode 41 and the detection electrode 42 is given as R. In other words, any of the resistance values of the counter electrode 21 between the detection electrodes 41a to 41h and the detection electrodes 42a to 42h is R. In addition, any of respective resistance values between the detection electrodes 41a to 41h and the detection electrodes 42a to 42h is Rc. Rc is smaller than R.

As illustrated in FIG. 3, the detection electrodes 41 and 42 are connected to a power supply circuit 51, as well as two current detectors 52, respectively, via the lines 12. Specifically, as illustrated in FIG. 6, the current detector 52 includes a plurality of shunt resistors 52a, selection circuits 52ba and 52bb, and voltmeters 52ca and 52cb. The shunt resistors 52a are arranged between the power supply circuit 51 and the detection electrodes 41a to 41h, respectively. Furthermore, the shunt resistors 52a are arranged between the power supply circuit 52 and the detection electrodes 42a to 42h, respectively. The resistance value of the shunt resistor 52a is Rs. Rs is smaller than R.

The power supply circuit 51 is connected to the detection electrodes 41a to 41h and the detection electrodes 42a to 42h via one of the shunt resistors 52a. Then, the power supply circuit 51 outputs a driving voltage. For example, the driving voltage is a sine wave (alternating voltage) having a predetermined amplitude and a predetermined frequency. In this configuration, no current flows through the counter electrode 21 when the pointer is not touching the counter electrode 21. However, when the pointer touches the counter electrode 21, the touched point becomes grounded, and thereby a current flows from the detection electrode pair (detection electrodes 41 and 42) toward the touched point. Therefore, the display device 100 according to the present embodiment identifies the touched point (coordinates) by detecting the voltage value (detection value) corresponding to the above-mentioned current.

The selection circuit 52ba selects the connection point connected to the voltmeter 52ca, from among the respective connection points connected between the detection electrodes 41a to 41h and the shunt resistor 52a. For example, the selection circuit 52ba sequentially switches the connection point (scans the connection points) connected to the voltmeter 52ca according to the control signal supplied from the touch coordinate detection circuit 2b. Then, the voltmeter 52ca detects the voltage value and transmits the detection result to the touch coordinate detection circuit 2b.

The selection circuit 52bb selects the connection point connected to the voltmeter 52cb from among the respective connection points connected between the detection electrodes 42a to 42h and the shunt resistor 52a. For example, the selection circuit 52bb sequentially switches (scans) the connection points connected to the voltmeter 52cb according to the control signal supplied from the touch coordinate detection circuit 2b. The selection circuit 52bb selects a connection point connected to the detection electrode 42 having the same Y coordinate as the detection electrode 41 connected to the connection point selected by the selection circuit 52ba.

Here, in the present embodiment, the touch coordinate detection circuit 2b acquires voltage values from the voltmeters 52ca and 52cb while the driving voltage is supplied from the power supply circuit 51 to the detection electrodes 41a to 41h and the detection electrodes 42a to 42h. Here, the voltage value detected by the voltmeter 52ca is given as V1. The voltage value detected by the voltmeter 52cb is given as V2. A connection point detected by the selection circuit 52ba and the selection circuit 52bb at the n-th time (n is a natural number) is given as CLn (clock n). Then, the touch coordinate detection circuit 2b acquires a difference value (V2−V1) between the voltage value V1 and the voltage value V2 from the voltmeters 52ca and 52cb. When the difference value (V2−V1) is not 0, the touch coordinate detection circuit 2b assumes that there has been a touch, and the touch coordinate detection circuit 2b acquires a total value (V1+V2) of the voltage value V1 and the voltage value V2. It should be noted that when the difference value (V2−V1) is 0, the touch coordinate detection circuit 2b determines that there is no touch.

Figure 7:
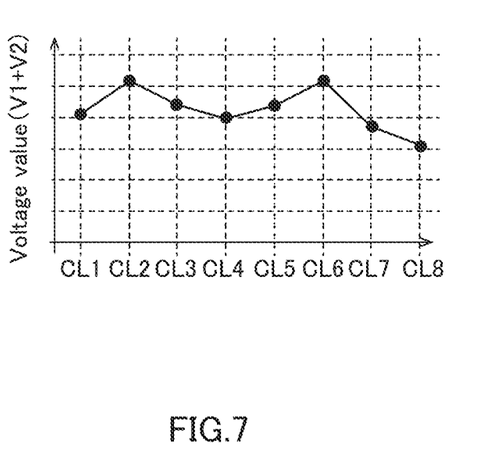
FIG. 7 is a diagram illustrating exemplary total values of a voltage value V1 and a voltage value V2 acquired by the touch coordinate detection circuit 2b.

FIG. 7 is a diagram illustrating exemplary total values of a voltage value V1 and a voltage value V2 acquired by the touch coordinate detection circuit 2b. The example in FIG. 7 shows total values of the voltage value V1 and the voltage value V2 at CL1 to CL8. The touch coordinate detection circuit 2b detects CL that is the peak value, from the total values of the voltage value V1 and the voltage value V2 at CL1 to CL8. The touch coordinate detection circuit 2b detects, for example, a CL(s) at which a larger value than that at an adjacent CL (CL2 and CL6 in the example of FIG. 7) is detected, as a CL(s) at which a peak value is detected. As a result, the touch coordinate detection circuit 2b determines that there are touch(es) by pointer(s) at positions of the Y coordinates of the detection electrodes 41b and 42b corresponding to CL2. Then, the touch coordinate detection circuit 2b determines that the positions of the Y coordinates of the detection electrodes 41b and 42b corresponding to CL2 are the Y coordinates of the touch(es) by the pointer(s). For example, the touch coordinate detection circuit 2b assumes values obtained by multiplying the number given to the clock ("2" in the case of CL2) by predetermined values (the widths of the detection electrodes 41 and 42 in the direction parallel to the Y axis), as the Y coordinates (Yp).

Figure 8:
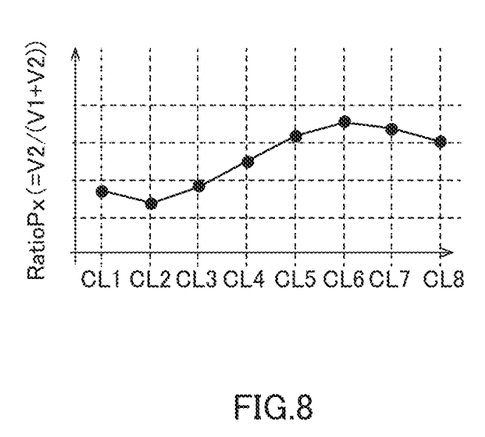
FIG. 8 is a diagram illustrating exemplary ratios of the voltage value V2 relative to the total value of the voltage values V1 and V2 acquired by the touch coordinate detection circuit 2b.

FIG. 8 is a diagram illustrating exemplary ratios of the voltage value V2 relative to the total value of the voltage values V1 and V2 acquired by the touch coordinate detection circuit 2b. The example in FIG. 8 shows a ratio of the voltage value V2 with respect to the total value of the voltage value V1 and the voltage value V2 at each of CL1 to CL8. Then, the touch coordinate detection circuit 2b calculates the ratio of the voltage value V2 with respect to the total value of the voltage value V1 and the voltage value V2, Px (=V2/(V1+V2)), in each of CL1 to CL8.

The touch coordinate detection circuit 2b determines X coordinate(s) (Xp) of a touch(es) by the pointer(s), using the ratio Px of the detection electrodes 41 and 42 at which it is determined that there are touches, based on the following formula (1):

$$Xp = (Px - C0)/K0 \times Wx \quad (1)$$

where Wx is the width in the direction parallel to the X axis of the touch panel 1.

Here, C0 and K0 are values obtained by taking the influences of the resistance (line resistance) of the detection electrode 41 or 42 and the resistance of the shunt resistor 52a into consideration, which are the values shown in the following equations (2) and (3):

$$C0 = (Rs + Rc)/(2Rs + 2Rc + R) \quad (2)$$

$$K0 = R/(2Rs + 2Rc + R) \quad (3)$$

With this configuration, even if the resistance (line resistance) of the detection electrode 41 or 42 and the resistance of the shunt resistor 52a are large enough to not be ignored, the display device 100 can calculate accurate X coordinates (Xp).

The touch coordinate detection circuit 2b transmits information (report) on the calculated X and Y coordinates (in the example of FIG. 6, the touch coordinates of two points (P1 and P2)) to the device control circuit 2a.

With the present embodiment, the presence or absence of a touch can be determined for each of the detection electrodes 41 and 42 arranged at different positions in the direction parallel to the Y axis. Therefore, even if the touch panel 1 is touched by pointer(s) at a plurality of positions that are different in the direction parallel to the Y axis, each of touches at a plurality of positions can be detected. Then, when it is determined that there are touches, the X coordinates of each of the multiple touched positions can be calculated, whereby touch coordinates at the multiple touched positions can be detected.

Figure 9:
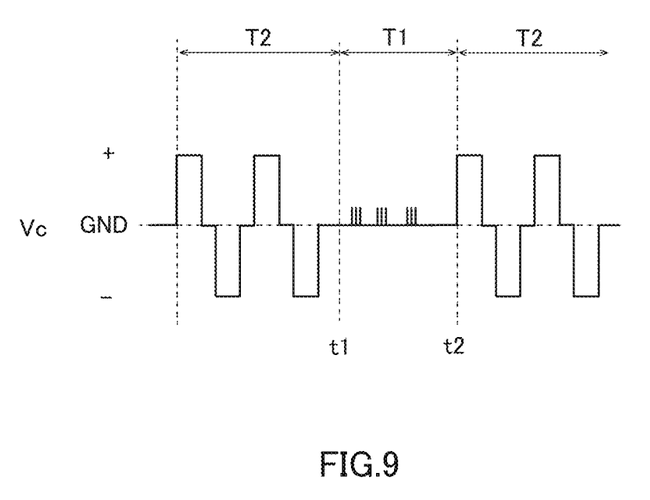
FIG. 9 is a diagram for explaining a signal supplied from the control circuit 2 to the counter electrode 21.

FIG. 9 is a diagram for explaining a signal supplied from the control circuit 2 to the counter electrode 21. In FIG. 9, the potential supplied to the counter electrode 21 is shown as Vc. As illustrated in FIG. 9, during the touch detection period T1, the control circuit 2 applies a voltage from the power supply circuit 51 to the counter electrode 21, and the touch coordinate detection circuit 2b detects the touch coordinates. During the display period T2, the control circuit 2 applies a common voltage Vc, that is, alternately applies a positive voltage and a negative voltage to the counter electrode 21. Then, image signals are supplied by the control circuit 2 to the pixel electrodes 11, and the image displayed is rewritten by the electrophoretic display section 30. The timing control circuit 2c of the control circuit 2 switches the touch detection period T1 and the display period T2 at predetermined time intervals. As a result, touch detection processing and display processing are executed in a time-division manner. This makes it possible to use the counter electrode 21 for both touch detection and display, thereby making it unnecessary to provide an electrode separate from (in a different layer from) the counter electrode 21.

Figure 10:
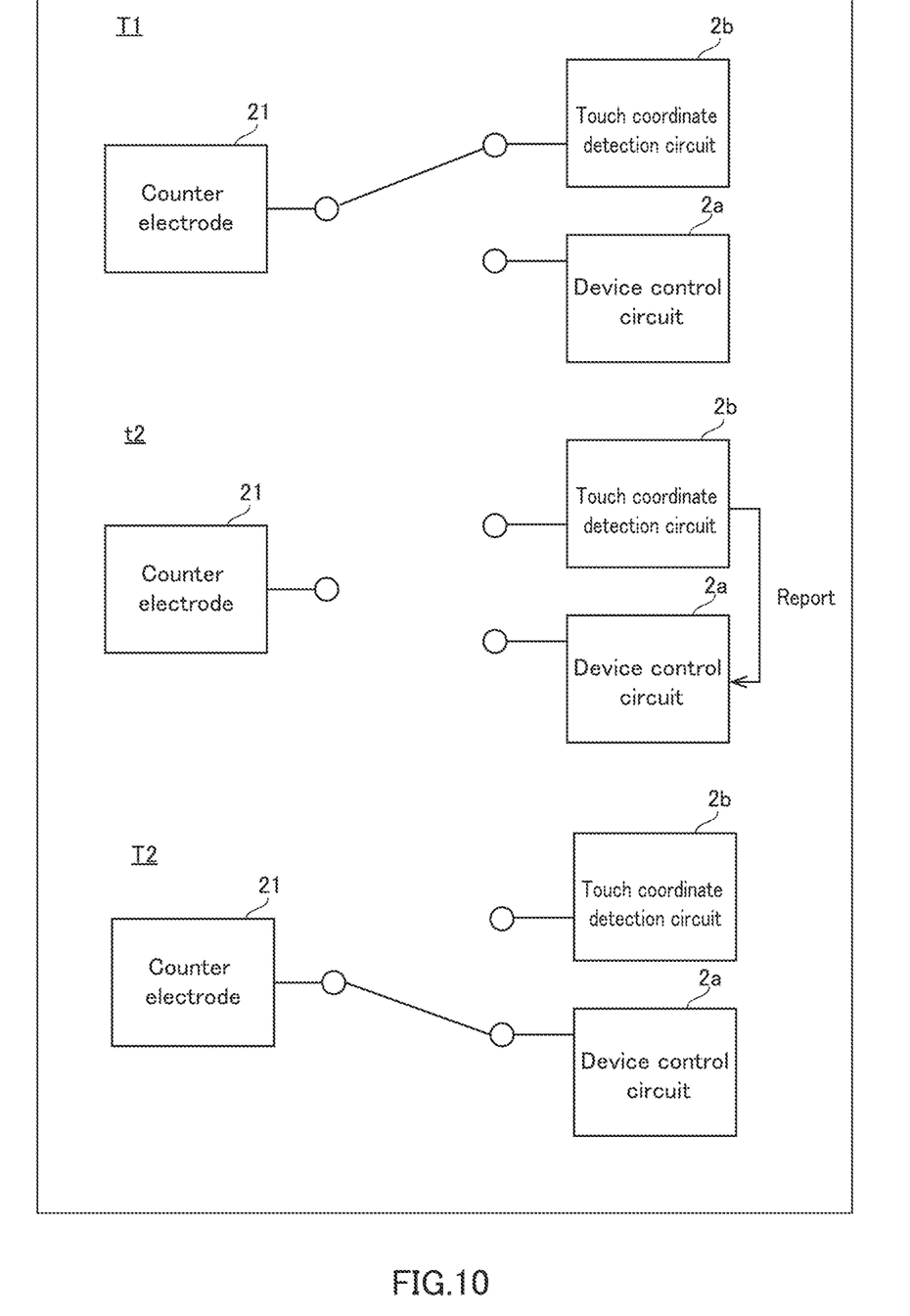
FIG. 10 is a diagram for explaining a state of connection between the counter electrode 21 and the control circuit 2.

FIG. 10 is a diagram for explaining a state of connection between the counter electrode 21 and the control circuit 2. As illustrated in FIG. 10, during the touch detection period T1, the counter electrode 21 is connected to the touch coordinate detection circuit 2b. During the display period T2, the counter electrode 21 is connected to the device control circuit 2a. It should be noted that at time t2 when the touch detection period T1 switches to the display period T2, a report (touch coordinates) is transmitted from the touch coordinate detection circuit 2b to the device control circuit 2a.

Modification Example

The above-described embodiment is merely an example for implementing the present disclosure. The present disclosure, therefore, is not limited to the above-described embodiment, and the above-described embodiment can be appropriately varied and implemented without departing from the spirit and scope of the disclosure.

(1) In the above embodiment, an example is shown in which microcapsules are provided in the electrophoretic display section, but the present disclosure is not limited thereto. That is, the electrophoretic display section may be composed of charged particles and a dispersion medium, while microcapsules are not provided in the electrophoretic display section.

(2) In the above embodiment, an example is shown in which the control circuit (device control circuit, touch coordinate detection circuit, and timing control circuit) is configured as an SOG formed on the pixel substrate, but the present disclosure is not limited to this. For example, at least a portion of the device control circuit, the touch coordinate detection circuit, and the timing control circuit may be arranged on a substrate separate from the pixel substrate.

(3) In the above embodiment, an example is shown in which the potential of the detection electrode detected by the voltmeter is used as the detection value, but the present disclosure is not limited to this. That is, an ammeter that detects current flowing through the detection electrode may be arranged, based on the value of the current, the presence or absence of a touch may be determined based on the value of the current, and the X coordinate of the touch may be determined. As illustrated in FIG. 6, since the current flows toward the touched position, the total value of the current flowing through the detection electrode pair corresponding to the Y coordinate of the touch increases. With this configuration, when the display device detects the peak value of the current, the Y coordinate corresponding to the peak value can be determined as the touch coordinate, as is the case with the example using the voltage values shown in FIG. 7, and the X coordinate can be determined as the touch coordinate based on the ratio, as is the case with the example using the voltage values shown in FIG. 8.

(4) In the above embodiment, an example is shown in which the selection circuit is provided, but the present disclosure is not limited to this. That is, a voltmeter may be disposed with respect to each of the detection electrodes.

(5) In the above embodiment, an example is shown in which the touch coordinate detection circuit is configured to detect a CL at which a larger value than that at an adjacent CL is detected, as a CL at which a peak value is detected, but the present disclosure is not limited to this. For example, the touch coordinate detection circuit may be configured to determine that there is a touch when the total value (V1+V2) is equal to or higher than a threshold voltage Vth.

(6) In the above embodiment, an example is shown in which the pixel substrate and the counter substrate are made of PET, but the present disclosure is not limited to this. For example, the pixel substrate and the counter substrate may be made of polycarbonate, acrylic, or quartz glass.

(7) In the above embodiment, an example is shown in which the presence or absence of a touch(es) by a pointer(s) is determined based on whether the difference value (V2−V1) between the voltage values of the detection electrode pair is 0, and when the difference value (V2−V1) is not 0, the peak value of the total voltage value (V2+V1) of the detection electrode pair is used to determine that there is a touch, but the present disclosure is not limited to this. In other words, the presence or absence of a touch(s) by a pointer(s) may be determined based on only either one of the following: whether the difference value (V2−V1) between voltage values of a detection electrode pair is 0 or not; and whether there is a peak of the total value (V2+V1) of voltage values of a detection electrode pair.

The above-described configuration can also be described as follows.

A touch panel built-in display device according to a first configuration includes: a plurality of pixel electrodes; a counter electrode arranged to face the plurality of pixel electrodes; an electrophoretic display section that includes charged particles arranged between the plurality of pixel electrodes and the counter electrode; a plurality of detection electrode pairs, each pair including a first detection electrode connected to the counter electrode in an edge part thereof on a first direction side, and a second detection electrode connected to the counter electrode in an edge part thereof on an opposite direction side with respect to the first direction side, the plurality of detection electrode pairs being arrayed in a second direction that crosses the first direction in plan view; and a touch coordinate detection circuit that detects a coordinate in the first direction and a coordinate in the second direction of a touch by a pointer, wherein the touch coordinate detection circuit supplies a voltage to the plurality of detection electrode pairs; acquires a detection value that is a value of current flowing through each of the detection electrodes of the plurality of detection electrode pairs, or a value of potential of the detection electrode; as to each detection electrode pair, determines presence or absence of a touch by a pointer at the coordinate in the second direction where the detection electrode pair is positioned, based on a total value or a difference value of the detection values of the detection electrode pair; and when determining that a touch is present, calculates the coordinate in the first direction of the touch by the pointer, based on a ratio of the detection value of the first detection electrode of the detection electrode pair at which a touch is determined to be present with respect to the total value of the detection electrode pair (the first configuration).

With the above-described first configuration, the presence or absence of a touch(es) can be determined for each of the detection electrode pairs arranged at different positions in the second direction, and therefore, even if the touch panel is touched by a pointer(s) at a plurality of positions that are different in the second direction, each of touches at a plurality of positions can be detected. Then, when it is determined that there is a touch(es), the X coordinates in the first direction of each of the multiple touched positions can be calculated, whereby touch coordinates at the multiple touched positions can be detected.

In the first configuration, the touch coordinate detection circuit may include: a resistor connected to the first detection electrode; and a voltmeter connected to the resistor, and the touch coordinate detection circuit may acquire a voltage value detected by the voltmeter as a detection value of the first detection electrode (the second configuration).

With the above-described second configuration, the detection value of the first detection electrode can be acquired by detecting a voltage value.

In the second configuration, the touch coordinate detection circuit may set C0 as a value given by the following formula (1a), and set K0 as a value given by the following formula (2a), wherein a coordinate X in the first direction of the touch by the pointer is calculated based on the following formula (3a) (the third configuration):

$$C0 = (Rs + Rc)/(2Rs + 2Rc + R) \quad (1a)$$

$$K0 = R/(2Rs + 2Rc + R) \quad (2a)$$

where R represents a resistance value of the counter electrode, Rc represents a resistance value of the detection electrode, and Rs represents a resistance value of the resistor, $$X = (Px - C0)/K0 \times Wx \quad (3a)$$

where Px represents a ratio of the detection value of the first detection electrode of the detection electrode pair with respect to the total value, and Wx represents a predetermined constant.

With the above-described third configuration, even when the resistance value of the detection electrode and the resistance value of the resistor are large enough to not be ignored, the coordinate in the first direction can be calculated accurately.

In the first configuration, the touch coordinate detection circuit may set a value obtained by multiplying a ratio of the detection value of the first detection electrode of the detection electrode pair with respect to the total value, by a predetermined constant, as a coordinate in the first direction of the touch by the pointer (the fourth configuration).

With the above-described fourth configuration, the calculation for determining the coordinate in the first direction can be simplified.

In any one of the first to fourth configurations, the touch panel may further include: a display drive circuit that supplies a display signal to the counter electrode; and a timing control circuit that allows supply of the display signal executed by the display drive circuit, and detection of a coordinate in the first direction and a coordinate in the second direction of a touch by a pointer executed by the touch coordinate detection circuit, to be executed in a time-division manner (the fifth configuration).

With the above-described fifth configuration, in which the period for displaying an image on the touch panel and the period for detecting a touch can be divided, it is possible to prevent the display of an image from affecting the detection of a touch, and also to prevent the detection of a touch from affecting the display of an image.

A method for controlling a touch panel built-in display device according to a sixth configuration is a method for controlling a touch panel built-in display device that includes: a plurality of pixel electrodes; a counter electrode arranged to face the plurality of pixel electrodes; an electrophoretic display section that includes charged particles arranged between the plurality of pixel electrodes and the counter electrode; a plurality of detection electrode pairs, each pair including a first detection electrode connected to the counter electrode in an edge part thereof on a first direction side, and a second detection electrode connected to the counter electrode in an edge part thereof on an opposite direction side with respect to the first direction side, the plurality of detection electrode pairs being arrayed in a second direction that crosses the first direction in plan view, the method including the steps of: supplies a voltage to the plurality of detection electrode pairs; acquiring a detection value that is a value of current flowing through each of the detection electrodes of the plurality of detection electrode pairs, or a value of potential of the detection electrode; as to each detection electrode pair, determining presence or absence of a touch by a pointer at the coordinate in the second direction where the detection electrode pair is positioned, based on a total value or a difference value of the detection values of the detection electrode pair; and when determining that a touch is present, calculating the coordinate in the first direction of the touch by the pointer, based on a ratio of the detection value of the first detection electrode of the detection electrode pair at which a touch is determined to be present with respect to the total value of the detection electrode pair (the seventh configuration).

With the above-described sixth configuration, it is possible to provide a method for controlling a touch panel built-in display device that includes an electrophoretic display section capable of detecting touch coordinates at the multiple touched positions.

The present disclosure contains subject matter related to that disclosed in Japanese Priority Patent Application JP 2023-070049 filed in the Japan Patent Office on Apr. 21, 2023, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A touch panel built-in display device comprising:
a plurality of pixel electrodes;
a counter electrode arranged to face the plurality of pixel electrodes;
an electrophoretic display section that includes charged particles arranged between the plurality of pixel electrodes and the counter electrode;
a plurality of detection electrode pairs, each pair being composed of a first detection electrode connected to the counter electrode in an edge part thereof on a first direction side, and a second detection electrode connected to the counter electrode in an edge part thereof on an opposite direction side with respect to the first direction side, the detection electrode pairs being arrayed in a second direction that crosses the first direction in plan view; and
a touch coordinate detection circuit that detects a coordinate in the first direction and a coordinate in the second direction of a touch by a pointer,
wherein the touch coordinate detection circuit
supplies a voltage to the plurality of detection electrode pairs;
acquires a detection value that is a value of current flowing through each of the detection electrodes of the plurality of detection electrode pairs, or a value of potential of the detection electrode;
as to each detection electrode pair, determines presence or absence of a touch by a pointer at the coordinate in the second direction where the detection electrode pair is positioned, based on a total value or a difference value of the detection values of the detection electrode pair; and
when determining that a touch is present, calculates the coordinate in the first direction of the touch by the pointer, based on a ratio of a detection value of the first detection electrode of the detection electrode pair at which a touch is determined to be present with respect to the total value of the detection electrode pair,
the touch coordinate detection circuit includes a resistor connected to the first detection electrode, and a voltmeter connected to the resistor,
the touch coordinate detection circuit acquires a voltage value detected by the voltmeter as a detection value of the first detection electrode, and
the touch coordinate detection circuit sets C0 as a value given by the following formula (1), and sets K0 as a value given by the following formula (2), wherein a coordinate X in the first direction of the touch by the pointer is calculated based on the following formula (3):

$$C0 = (Rs + Rc)/(2Rs + 2Rc + R) \quad (1)$$

$$K0 = R/(2Rs + 2Rc + R) \quad (2)$$

where R represents a resistance value of the counter electrode, Rc represents a resistance value of the detection electrode, and Rs represents a resistance value of the resistor, $$X = (Px - C0)/K0 \times Wx \qquad (3)$$

where Px represents a ratio of the detection value of the first detection electrode of the detection electrode pair with respect to the total value, and Wx represents a predetermined constant.

2. The touch panel built-in display device according to claim 1,
wherein the touch coordinate detection circuit sets a value obtained by multiplying a ratio of the detection value of the first detection electrode of the detection electrode pair with respect to the total value, by a predetermined constant, as the coordinate in the first direction of the touch by the pointer.

3. The touch panel built-in display device according to claim 1, the touch panel built-in display device further comprising:
a display drive circuit that supplies a display signal to the counter electrode; and
a timing control circuit that allows supply of the display signal executed by the display drive circuit, and detection of a coordinate in the first direction and a coordinate in the second direction of a touch by a pointer executed by the touch coordinate detection circuit, to be executed in a time-division manner.

4. A method for controlling a touch panel built-in display device, wherein the touch panel built-in display device includes:
a plurality of pixel electrodes;
a counter electrode arranged to face the plurality of pixel electrodes;
an electrophoretic display section that includes charged particles arranged between the plurality of pixel electrodes and the counter electrode; and
a plurality of detection electrode pairs, each pair being composed of a first detection electrode connected to the counter electrode in an edge part thereof on a first direction side, and a second detection electrode connected to the counter electrode in an edge part thereof on an opposite direction side with respect to the first direction side, the detection electrode pairs being arrayed in a second direction that crosses the first direction in plan view; and
a resistor connected to the first detection electrode, and a voltmeter connected to the resistor, the method comprising the steps of:
supplying a voltage to the plurality of detection electrode pairs;
acquiring a detection value that is a value of current flowing through each of the detection electrodes of the plurality of detection electrode pairs, or a value of potential of the detection electrode;
as to each detection electrode pair, determining presence or absence of a touch by a pointer at the coordinate in the second direction where the detection electrode pair is positioned, based on a total value or a difference value of the detection values of the detection electrode pair;
when determining that a touch is present, calculating the coordinate in the first direction of the touch by the pointer, based on a ratio of a detection value of the first detection electrode of the detection electrode pair at which a touch is determined to be present with respect to the total value of the detection electrode pair; and
acquiring a voltage value detected by a voltmeter connected to a resistor that is connected to the first detection electrode as a detection value of the first detection electrode; wherein
in determining that the touch is present, setting C0 as a value given by the following formula (1), and setting K0 as a value given by the following formula (2), wherein a coordinate X in the first direction value is calculated based on the following formula (3):

$$C0=(Rs+Rc)/(2Rs+2Rc+R) \qquad (1)$$

$$K0=R/(2Rs+2Rc+R) \qquad (2)$$

where R represents a resistance value of the counter electrode, Rc represents a resistance value of the detection electrode, and Rs represents a resistance value of the resistor, $$X=(Px-C0)/K0 \times Wx \qquad (3)$$

where Px represents a ratio of the detection value of the first detection electrode of the detection electrode pair with respect to the total value, and Wx represents a predetermined constant.

* * * * *